United States Patent [19]

McDermid et al.

[11] Patent Number: 4,559,500

[45] Date of Patent: Dec. 17, 1985

[54] MIRROR-GRATING TUNING ARRANGEMENT FOR HIGH RESOLUTION LASERS

[75] Inventors: Iain S. McDermid, Pasadena; Thomas J. Pacala, La Canada, both of Calif.

[73] Assignee: California Institute of Technology, Pasadena, Calif.

[21] Appl. No.: 310,211

[22] Filed: Oct. 9, 1981

[51] Int. Cl.⁴ .................... H01S 3/086; H01S 3/10; G01B 9/02

[52] U.S. Cl. ..................... 330/4.3; 372/20; 372/94; 372/102

[58] Field of Search ............ 330/4.3; 372/20, 32, 372/94, 102; 350/6 J

[56] References Cited

U.S. PATENT DOCUMENTS

| | | | |
|---|---|---|---|
| 3,691,477 | 9/1972 | Janney | 372/102 |
| 3,928,817 | 12/1975 | Chodzko | 372/102 |
| 4,229,710 | 10/1980 | Shoshan | 372/102 |
| 4,287,486 | 9/1981 | Javan | 372/102 |
| 4,361,889 | 11/1982 | Johnson | 372/102 |

FOREIGN PATENT DOCUMENTS 0197709 8/1977 U.S.S.R. .................... 372/102

OTHER PUBLICATIONS

"Single-Mode Operation of Grazing-Incidence Pulsed Dye Laser" by Michael G. Littman, Optics Letters, vol. 3, pp. 138-140, Oct. 1978.

Saikan et al., "Modified Double-Grating . . . Dye Laser", 7/81, pp. 1339-1340, Jpn. J. Appl. Phys., vol. 20, No. 7.

Dinev et al., "A Novel Double Grazing-Incidence . . . Laser", 7/80, pp. 287-291, Appl. Phys. vol. 22, No. 3.

Shoshen et al., "Narrowband Operation . . . Expansion", 11/77, pp. 4495-4497, Jour. App. Phys., vol. 48, No. 11.

Primary Examiner—Nelson Moskowitz
Attorney, Agent, or Firm—Freilich, Hornbaker, Rosen & Fernandez

[57] ABSTRACT

A tuning arrangement (10) for a tunable laser comprises a single holographic grating (12) and two flat surface reflective mirrors (13 and 14). The beam (15) from the laser cavity is incident on the grating at a grazing angle for optimum beam expansion. The diffracted beam propogates from the grating to the first mirror (13), therefrom to the second mirror (14) and is reflected at the Littrow angle to the grating, whereat it is diffracted a second time and returned to the second mirror (14) for reflection to the first mirror (13). Therefrom it is reflected back to the grating. After undergoing a third diffraction it is directed back into the cavity for further amplification.

2 Claims, 1 Drawing Figure

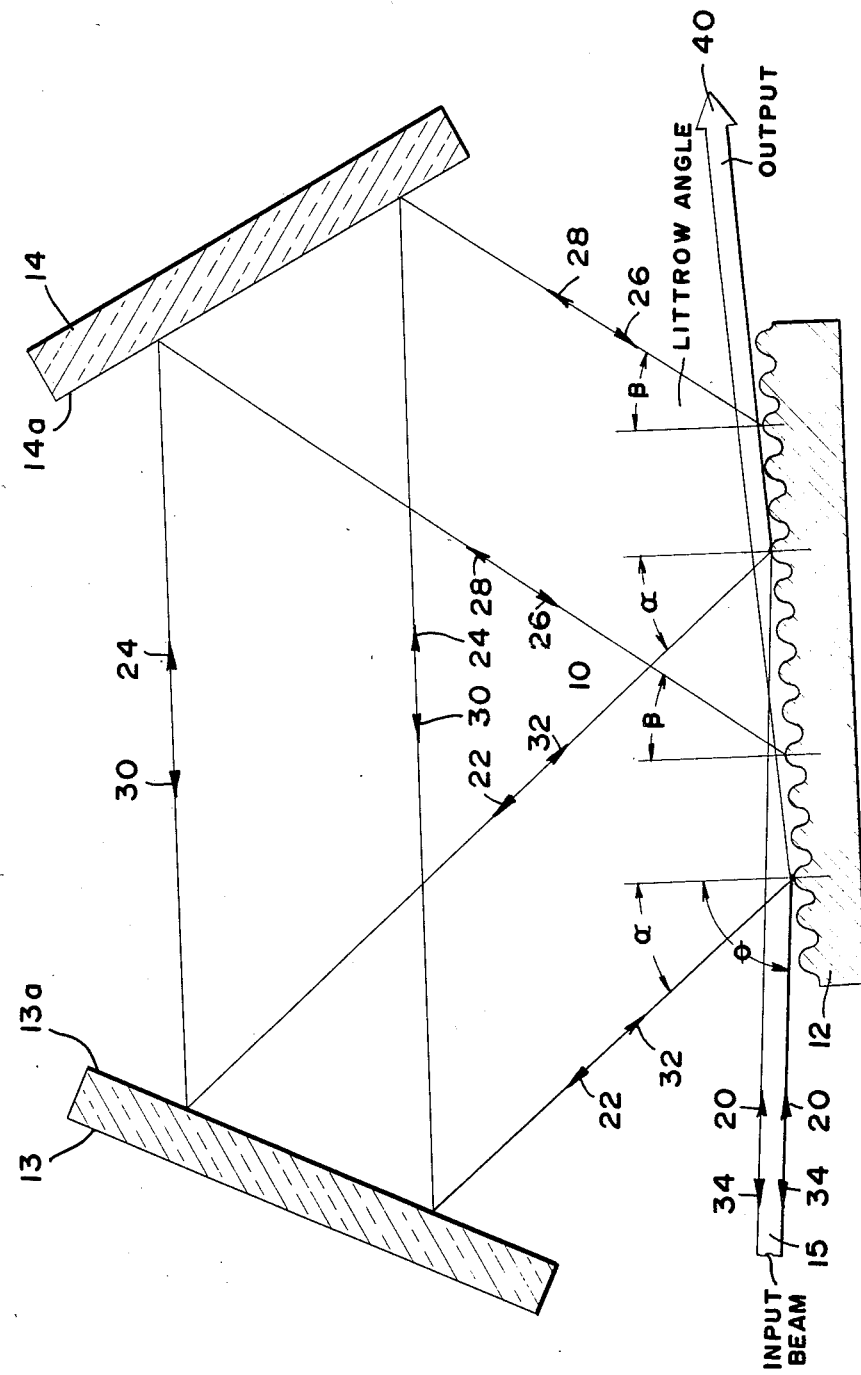

MIRROR-GRATING TUNING ARRANGEMENT FOR HIGH RESOLUTION LASERS

ORIGIN OF THE INVENTION

The invention described herein was made in the performance of work under a NASA contract and is subject to the provisions of Section 305 of the National Aeronautics and Space Act of 1958, Public Law 85–568 (42 Stat. 435; 42 USC2457).

FIELD OF THE INVENTION

Several arrangements have been proposed to eliminate the need for an intracavity beam expander which improves wavelength selectivity in a tunable laser. These arrangements are described in an article entitled "Singlemode operation of grazing-incidence pulsed dye laser" by Michael G. Littman, Optics Letters, Volume 3, pages 138–140, October 1978. In said article, an arrangement is summarized, consisting of a single diffraction grating, which is used with a tuning mirror. To illuminate the full width of the diffraction grating, for narrow spectral-bandwidth operation, a grazing angle of incidence is used. In operation, the unexpanded beam from the cavity is expanded on diffraction by the grating. Part of the beam is reflected out, while the diffracted beam is directed to the tuning mirror which reflects a specific tuned wavelength directly back to the grating. The back reflected beam is diffracted again by the grating and is returned into the laser cavity.

Also disclosed in the article is an improved arrangement in which tuning is achieved with three successive beam diffractions, thus enhancing beam tuning. This arrangement includes two gratings. One is the grating at the grazing incidence angle. The second grating is referred to as the Littrow grating.

As is appreciated by those familiar with the art, the cost of gratings is quite high, while that of mirrors is relatively very small. Thus, the need for two gratings increases the overall cost of the tuning arrangement. Also, in the two-grating arrangement the lines of the two gratings have to be parallel for proper operation, thus increasing alignment requirements.

SUMMARY OF THE INVENTION

It is a primary object of the invention to provide a new improved tuning arrangement for a tunable laser.

Another object of the invention is to provide an improved tuning arrangement for a tunable laser which is less expensive and more simply alignable than prior art arrangements.

These and other objects of the invention are achieved by providing a tuning arrangement consisting of a single grating and a pair of flat-faced reflecting mirrors, which are arranged in a way whereby the single grating, in addition to expanding the beam, diffracts it three times before the back-reflected beam returns to the laser cavity. Such an arrangement is less expensive then the two-grating arrangement, since it requires only one grating of the holographic type which is relatively inexpensive. Also, the alignments and adjustments of the two mirrors are less complex and less time consuming than the precise alignment which is required when two separate gratings are used.

The novel features of the invention are set forth with particularity in the appended claims. The invention will be best understood from the following description when read in conjunction with the accompanying drawing.

BRIEF DESCRIPTION OF THE DRAWING

The single FIGURE is a cross-sectional side view of the novel tuning arrangement of the present invention.

DETAILED DESCRIPTION OF THE PREFERRED EMBODIMENTS

Attention is now directed to the single FIGURE wherein the novel tuning arrangement of the present invention, designated by numeral 10, is shown. It consists of a grating 12 of the holographic type, and two mirrors 13 and 14 with flat front reflective surfaces 13a and 14a, respectively. The mirrors 13 and 14 are adjustable for alignment purposes, as will be described hereafter.

The input to the tuning arrangement is a beam 15 from the cavity of a tunable laser, which may be any known tunable laser, e.g. a pulsed dye laser, excimer laser or the like. In the FIGURE the direction of the beam 15 to the tuning arrangement is designated by arrowheads 20. In order to maximize the expansion of the beam by grating 12, the latter is positioned with respect to the incoming direction of the beam so that beam is incident on the grating at a large angle, designated in the FIGURE by $\theta$. Preferrably $\theta$ should be as close to 90° as practical.

The expanded beam is diffracted by the grating 12 and propogates toward mirror 13, as indicated by arrow heads 22 at a diffraction angle $\alpha$. At the mirror surface 13a the once-diffracted beam is reflected toward mirror surface 14a, as indicated by arrow heads 24, and is then reflected by mirror surface 14a toward the grating 12, as indicated by arrow heads 26.

The mirrors' positions are adjusted so that the beam from mirror 14 is incident on the grating 12 at the Littrow angle, designated as $\beta$, i.e. at an incident angle which is equal to the diffraction angle. Thus, when the once-diffracted beam is incident on the grating, after being diffracted again by the grating 12 the twice-diffracted beam is directed to mirror surface 14a as designated by arrow heads 28 at the Littrow angle, represented by $\beta$.

The twice-diffracted beam, when reaching the reflective surface 14a of mirror 14 is reflected to mirror 13, as indicated by arrowheads 30. At surface 13a of mirror 13 the twice-diffracted beam is reflected to grating 12. Thereat, it undergoes a third diffraction. Thus with the novel tuning arrangement 10 the beam is diffracted three times. After the third diffraction, the beam, reduced to its original size, is directed back into the cavity for further amplification, as indicated by arrow heads 34.

The portion of the beam 15 which is directed to the grating and which does not get diffracted to mirror 13 is reflected out of the laser cavity and represents the laser output, designated by numeral 40.

From the foregoing it should be apparent that in both the improved tuning arrangement, described in the above-referred to article, and in the present invention the beam is diffracted three times for enhanced tuning, during each pass through the tuning arrangement. However, in the prior art arrangement two gratings are needed, which have to be aligned precisely so that their lines are parallel. In the arrangement of the present invention only one grating is required. Also, in the present invention the single grating, which should have symmetrical grooves, may be of the holographic type. Such a grating is relatively inexpensive. In the prior art arrangement, at least one of the two gratings would normally be machine ruled, which is very expensive. It is achnowledged that in the present invention two flat mirrors are required. However, their cost compared with the cost of a machined grating is practically insignificant. Also, in the prior art arrangement the alignment problems of the two gratings are considerable compared to the alignment of mirrors 13 and 14 with respect to grating 12. Thus, the present invention represents a significant advance over the prior art, both in terms of cost and alignment requirements.

Although particular embodiments of the invention have been described and illustrated herein, it is recognized that modifications and variations may readily occur to those skilled in the art and consequently, it is intended that the claims be interpreted to cover such modifications and equivalents.

What is claimed is:

1. A tuning arrangement for a tunable laser in which a tunable beam is amplifiable in the laser cavity, the arrangement comprising:

a single diffraction grating; and beam steering means comprising first and second reflective mirrors positionable with respect to said grating for causing a beam directed to said grating from said cavity to be diffracted three times by said grating prior to being redirected to said cavity for further amplification, said first and second mirrors being positioned with respect to said single grating to cause said beam directed to said single grating from said cavity to be diffracted by the grating and to be directed to said first mirror and therefrom to be reflected to said second mirror from which it is reflected to said single grating at a Littrow angle with respect to said grating, with the beam after being diffracted a second time by said grating then being directed back to said second mirror for reflection to said first mirror and thence back to said grating where the beam is diffracted a third time before it is returned to said cavity.

2. A tuning arrangement as recited in claim 1 wherein said grating is of the holographic type.

* * * * *